United States Patent [19]
Kou

[11] Patent Number: 5,790,535
[45] Date of Patent: Aug. 4, 1998

[54] SATELLITE COMMUNICATIONS SYSTEM CARRYING OUT RESERVATION OF NECESSARY TIME SLOTS BY PREDICTION OF REPLY DATA IN REMOTE STATIONS

[75] Inventor: Yukari Kou, Tokyo, Japan

[73] Assignee: NEC Corporation, Tokyo, Japan

[21] Appl. No.: 577,612

[22] Filed: Dec. 22, 1995

[30] Foreign Application Priority Data

Dec. 26, 1994 [JP] Japan .................................. 6-322639

[51] Int. Cl.$^6$ .................................. H04B 7/212; H04J 3/16
[52] U.S. Cl. ...................... 370/337; 370/346; 370/347; 370/348; 370/349; 370/443
[58] Field of Search ................................. 370/280, 321, 370/322, 337, 346, 347, 348, 349, 442, 443, 447, 449, 458, 461, 462; 342/42, 51, 58, 352, 353; 455/11.1, 12.1, 53.1, 54.1, 54.2

[56] References Cited

U.S. PATENT DOCUMENTS

| | | | |
|---|---|---|---|
| 4,736,371 | 4/1988 | Tejima et al. | 370/443 |
| 5,065,398 | 11/1991 | Takashima | 370/347 |
| 5,278,833 | 1/1994 | Crisler et al. | 370/348 |
| 5,295,140 | 3/1994 | Crisler et al. | 370/458 |
| 5,297,144 | 3/1994 | Gilbert et al. | 370/346 |

FOREIGN PATENT DOCUMENTS 2308636 12/1990 Japan .

*Primary Examiner*—Alpus H. Hsu

[57] ABSTRACT

In a channel access system wherein a common communication channel is divided into frames on each having a predetermined number of time slots which are classified into random access time slots and reservation time slots, a central station including a data selector section (31) carrying out a reservation request for time slots for a destined remote station. A central reservation slot control section (32) generates a central slot assignment table including reservation time slots exclusively for each of the remote stations. A reservation information generating section (33) generates reservation assignment information indicative of the reservation time slots. Each remote station comprises a reservation control section (50) for setting the number of necessary reservation time slots in accordance with conditions of occurrence and storing of remote transmission data thereof. A remote reservation slot control section (53) generates a remote slot assignment table on the basis of the reservation assignment information. A transmission control section (51) transmits, on the basis of the number of the reservation time slots, the remote transmission data with reservation request information suitably added to the remote transmission data on a selected one of the reservation time slots exclusive therefor or the random access time slots.

9 Claims, 12 Drawing Sheets

SATELLITE COMMUNICATIONS SYSTEM CARRYING OUT RESERVATION OF NECESSARY TIME SLOTS BY PREDICTION OF REPLY DATA IN REMOTE STATIONS

BACKGROUND OF THE INVENTION

This invention relates to a satellite communications system of a multiple access type in which a central station and a plurality of remote stations carry out communication by using a common communication channel via a satellite transponder and, in particular, to a satellite channel access system improving an access system from the central station to each of the remote stations.

As is well known in the art, time division multiple access (TDMA) systems are multiple access systems in which a plurality of remote stations share a satellite common channel in a time division fashion and carry out communication with a central station via the satellite common channel. A first one of the TDMA channel access systems is the slotted ALOHA system. The slotted ALOHA system is an improved one of random access systems where each remote station freely sends data on the common channel on generation of data. In the slotted ALOHA system, time slots, each of which is a time division unit on the satellite common channel, are set and that all of the remote stations randomly access the time slots to transmit packeted data on the time slots is allowed. Inasmuch as the slotted ALOHA system operates on a random access basis, a collision occurs.

A second one of the TDMA channel access systems is a slot reservation scheme. In this scheme, a remote station at first transmits data for request of slot reservation by random access on the time slot. The central station assigns the time slot exclusively for the remote station in question. That is, the central station schedules reservations from the remote earth stations and transmits assignment information for the time slot to the remote station to inform the remote station of an assigned time slot. Simultaneously the central station indicates so that other remote stations do not transmit data on the assigned time slot. This scheme can reduce the effects of collisions in the slotted ALOHA system and enables flexible adaptation in stable in a system where an occurrence rate of messages is relatively high.

However, in the slot reservation scheme, the effects of collisions does not satisfactorily solved. This is because a transmission of data for reserving the time slot is carried out by random access. In addition, the slot reservation scheme is disadvantageous in that it has a longer time delay for data transmission in comparison with the slotted ALOHA system.

Another system is disclosed in U.S. Pat. No. 4,736,371 issued to Shunichiro Tejima et al. A TDMA data communication system according to Tejima et al. is a system which combines a random access technique for transmission of short message signals with a slot reservation technique for transmission long message signals. The system has a communication channel shared by a plurality of stations. The channel is divided into frames each being partitioned into time slots smaller in number than the number of stations of the system. A reservation status signal is constantly broadcast at frame intervals from a central station to all remote stations to indicate reserved status of the time slots. When a transmission request is made in a remote station, it discriminates a message signal shorter than the time slot length as a signal packet having a time slot length and detects an idle time slot from the channel using the reservation status signal. If the message signal is longer than the time slot length, the station divides it into a series of packets of the time slot length and transmits a reservation request to the central station to receive from it a time-slot assignment signal and inserts the long-message packets to time slots specified by the time-slot assignment signal. However, the TDMA data communication system according to Tejima et al. is disadvantageous in that it is difficult to apply a system so that messages generated by the remote station have a variable amount of data. This is because the central station broadcasts the time-slot assignment signal only when the central station receives the reservation request signal from any remote station. In other words, the central station broadcasts the time-slot assignment signal without prediction of reply data from the remote stations.

In addition, still another system is disclosed in Japanese Unexamined Patent Prepublication of Kôkai No. Hei 2-308,636, namely, 308,636/1990. According to Kôkai No. Hei 2-308,636, in fault detection of the remote station by the central station, to reduce the effects of collisions of data sent from the remote station, the central station has a time slot reservation or assignment function. This system assumes a system so that the central station sends a command for fault detection of the remote stations to each remote station and the central station receives reply for the command from the remote station. In such a system, the central station carries out reservation or assignment for a time slot by predicting reply data from the remote stations. This system can comparatively solve the effects of collisions of data on fault detection sent from the remote stations. However, the system also cannot be effectively applied to a system which deals with messages having a variable amount of data. This is because reply data from the remote station is restricted during only one time slot in the manner which will later be described in conjunction with FIG. 12. In addition, each remote station cannot reserve in the system according to Kôkai No. Hei 2-308,636.

SUMMARY OF THE INVENTION

It is therefore an object of this invention to provide a TDMA satellite channel access system which is capable of putting the system into a stable condition by drastically decreasing a probability of collisions of data sent from remote stations.

It is another object of this invention to provide a TDMA satellite channel access system of the type described, which is capable of carrying out effective data transmission with a little time delay for transmission of data which remote stations should transmit.

It is still another object of this invention to provide a TDMA satellite channel access system of the type described, which is capable of certainly send data in the remote stations although an occurrence rate of messages is high in the remote stations as a result of prediction of reply data from the remote stations when the central station transmits data to the remote stations and of assignment of necessary time slots in response to requests of the remote stations.

It is yet another object of this invention to provide a TDMA satellite channel access system of the type described, which is capable of flexibly sending data although the occurrence rate of the messages in the remote stations has a large fluctuation as a result of prediction of reply data from the remote stations when the central station transmits data to the remote stations, of reservation or assignment of the necessary time slots to the remote stations, and of use of the reservation time slots for transmitting not only the reply data but also terminal data for the respective remote stations.

It is a further object of this invention to provide a TDMA satellite channel access system of the type described, which is capable of decreasing a delay for data as a result of transmission of data to the remote stations by the central station, of prediction of reply data from the remote stations on the basis of the data, of judgment of a timing at which data of the remote stations occurs, and of assignment of the time slots by the central station.

It is a still further object of this invention to provide a central station for use in a TDMA satellite channel access system, which is capable of carrying out a general management of reservation time slots so as to decrease collisions of data sent from each remote station and a delay of transmission of data from each remote station.

It is a yet further object of this invention to provide a remote station for use in a TDMA satellite channel access system, which is capable of sending almost all of data on reservation time slots although there is fluctuation in amount of messages occurring in each remote station and therefore of reducing the collisions of data and the delay of transmission of data.

Other objects of this invention will become clear as the description proceeds.

On describing the gist of this invention, it is possible to understand that a channel access system of a time division multiple access type carries out a time division multiple communication between a central station and a plurality of remote stations using a common communication channel. The common communication channel is divided into frames each having a predetermined number of time slots of equal length. The time slots are classified into random access time slots for being randomly accessible by each remote station and reservation time slots for being accessible by reservation.

According to an aspect of the invention, the above-mentioned central station comprises: first means for carrying out assignment and establishment of the number of reservation time slots for each of the remote stations on the basis of the presence and absence of occurrence of remote transmission data by a destined remote station owing to central transmission data of the central station, prediction of occurrence of the remote transmission data, and reservation requests by the remote stations; second means for assigning an assigned number of time slots to predetermined positions as reservation time slots exclusively for each of the remote stations; and third means for transmitting reservation assignment information indicative of the reservation time slots. Each of the above-mentioned remote stations comprises fourth means for transmitting the remote transmission data in accordance with conditions of occurrence and storing of the remote transmission data thereof with reservation request information indicative of the reservation request suitably added to the remote transmission data on a selected one of the reservation time slots exclusively therefor and the random access time slots.

Preferably, the first means may carry out assignment of at least one reservation time slot on transmission of one of system/control data for the remote stations and polling data from a host terminal equipment connected to the central station. In addition, the first means may predict a timing of occurrence of the remote transmission data from the destined remote station on the basis of the central transmission data to determine an assignment position of the reservation time slots exclusively for each of the remote stations.

DESCRIPTION OF THE PREFERRED EMBODIMENT

Figure 1:
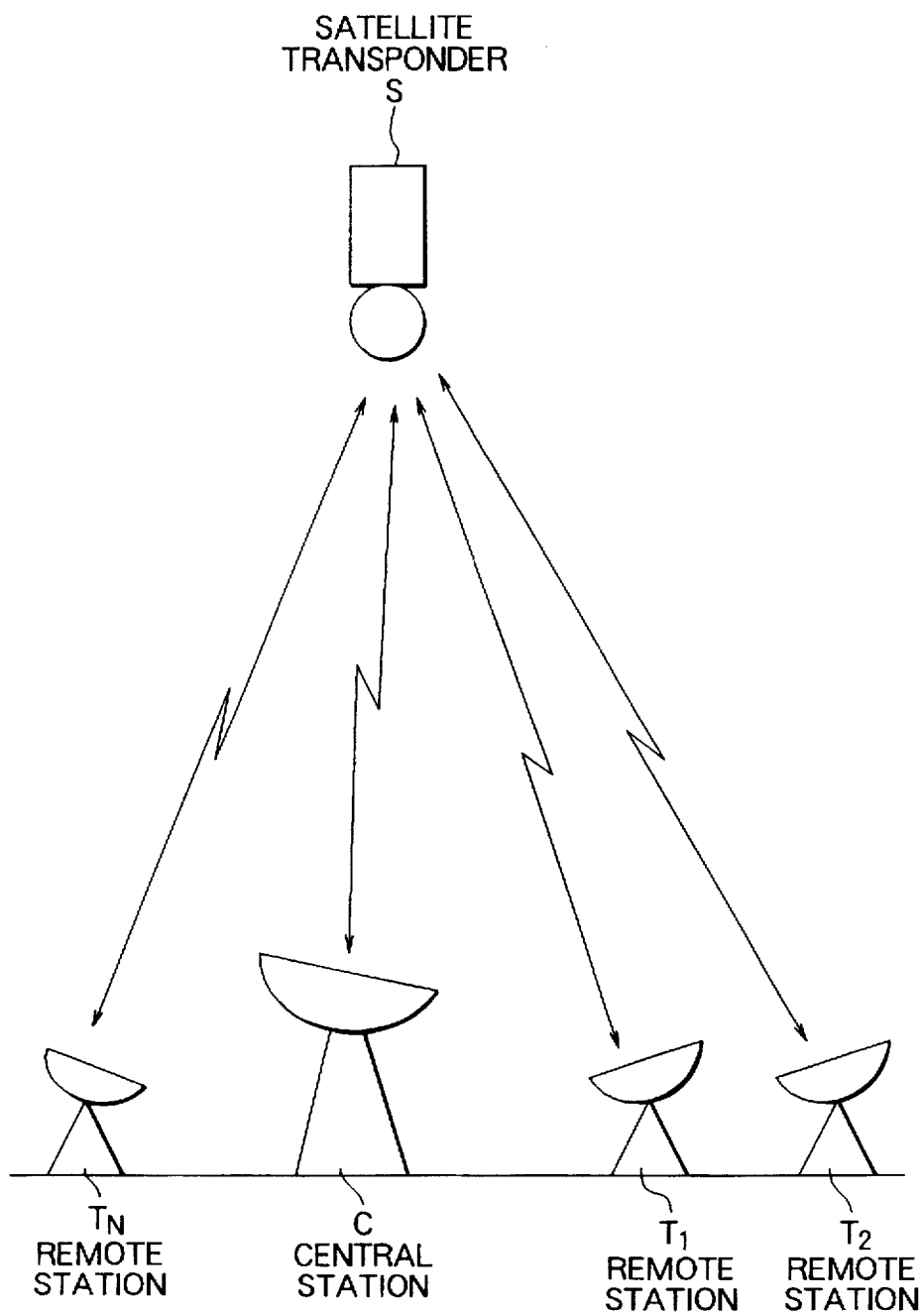
FIG. 1 is a schematic block diagram of a multiple access satellite communications system suitable for application of the present invention.

Referring to FIG. 1, description will proceed to a multiple access satellite communications system to which a satellite channel access system according to an embodiment of this invention is applicable. The illustrated multiple access satellite communications system comprises a central earth station C, first through N-th remote earth stations $T_1, T_2, \ldots,$ and $T_N$, and a satellite transponder S, where N represents a predetermined integer which is not less than two. The first through the N-th remote earth stations $T_1$ to $T_N$ carry out access to the central earth station C by time-sharing a common communication channel via the satellite transponder S. The multiple access satellite communications system realizes a star-type network with the central earth station C connected to a host terminal equipment (not shown) and with each of the first through the N-th remote earth stations connected to a user data terminal equipment (not shown). The remote earth stations are assigned with individual remote addresses.

Figure 2:
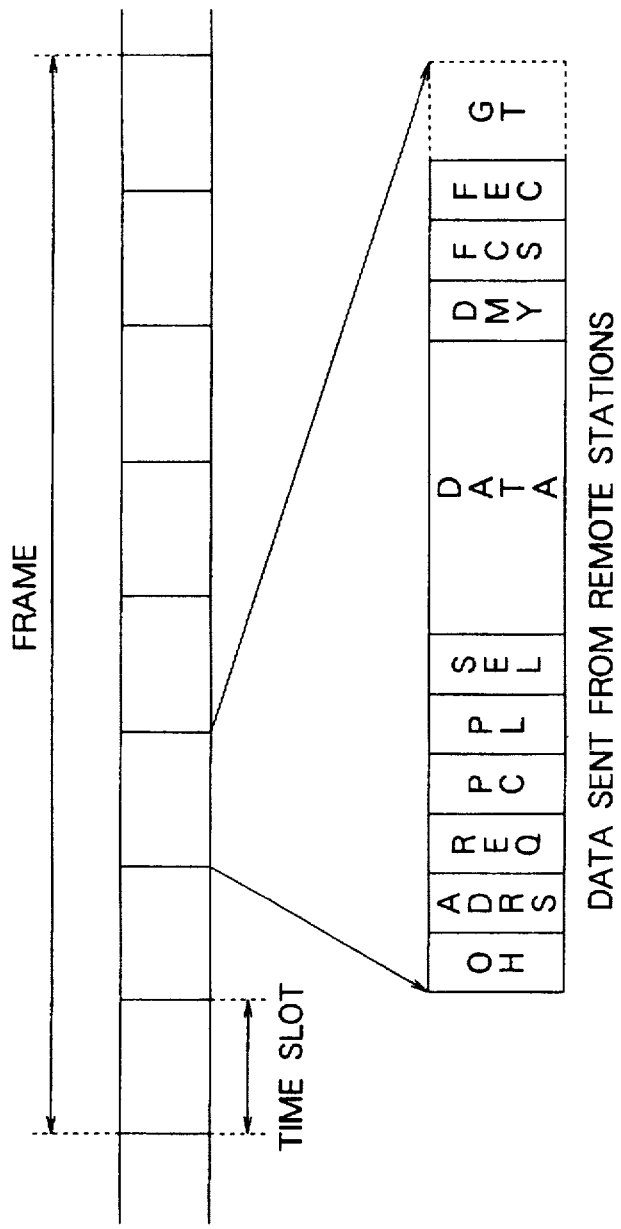
FIG. 2 is an illustration of a data format employed by the remote stations of FIG. 1.

FIG. 2 shows a format of a signal transmitted by the first through the N-th remote earth stations $T_1$ to $T_N$ to the central earth station C. In transmission of data from the first through the N-th remote earth stations $T_1$ to $T_N$ to the central earth station C, the common communication channel is divided into a plurality of frames each having a predetermined time interval and each frame is divided into a plurality of time slots each of which acts as a basic transmission unit for packeted data. In the example being illustrated, the frame is divided into eight time slots.

The packeted data transmitted from the first through the N-th remote earth stations $T_1$ to $T_N$ to the central earth station C has the format as illustrated in FIG. 2. That is, the packeted data comprises an overhead field (OH), an address field (ADRS), a request field (REC), an information field (PC), a length field (PL), a selector field (SEL), a data field (DATA), a dummy field (DMY), a frame check sequence field (FCS), a redundancy field (FEC), and a time guard field (GT). The overhead field (OH) consists of a preamble subfield (not shown) for carrier and clock recovery and a unique word subfield (not shown) indicative of head of data. The address field (ADRS) indicates a sender address of the remote earth station. The request field (REQ) indicates the number of time slots for requesting reservation. The information field (PC) is for composing a plurality of packets into a long message in the central earth station C when the long message is divided into the packets in the remote earth stations. The length field (PL) indicates a length of the data field (DATA) included in the packeted data in question. The selector field (SEL) indicates whether the message included in the packeted data occurs in the user data terminal or is generated for system control and monitor within the remote earth station. The data field (DATA) includes the message data itself. The dummy field (DMY) consists of dummy bits for use in making the length of the packeted data uniform with that of the time slot. The frame check sequence field (FCS) is for checking data between the address field (ADRS) and the dummy field (DMY), both inclusive. The redundancy field (FEC) consists of redundancy bits for error correction. The time guard field (GT) is for securing a time interval between the packeted data in question and a packeted data transmitted on the next time slot.

Figure 3:
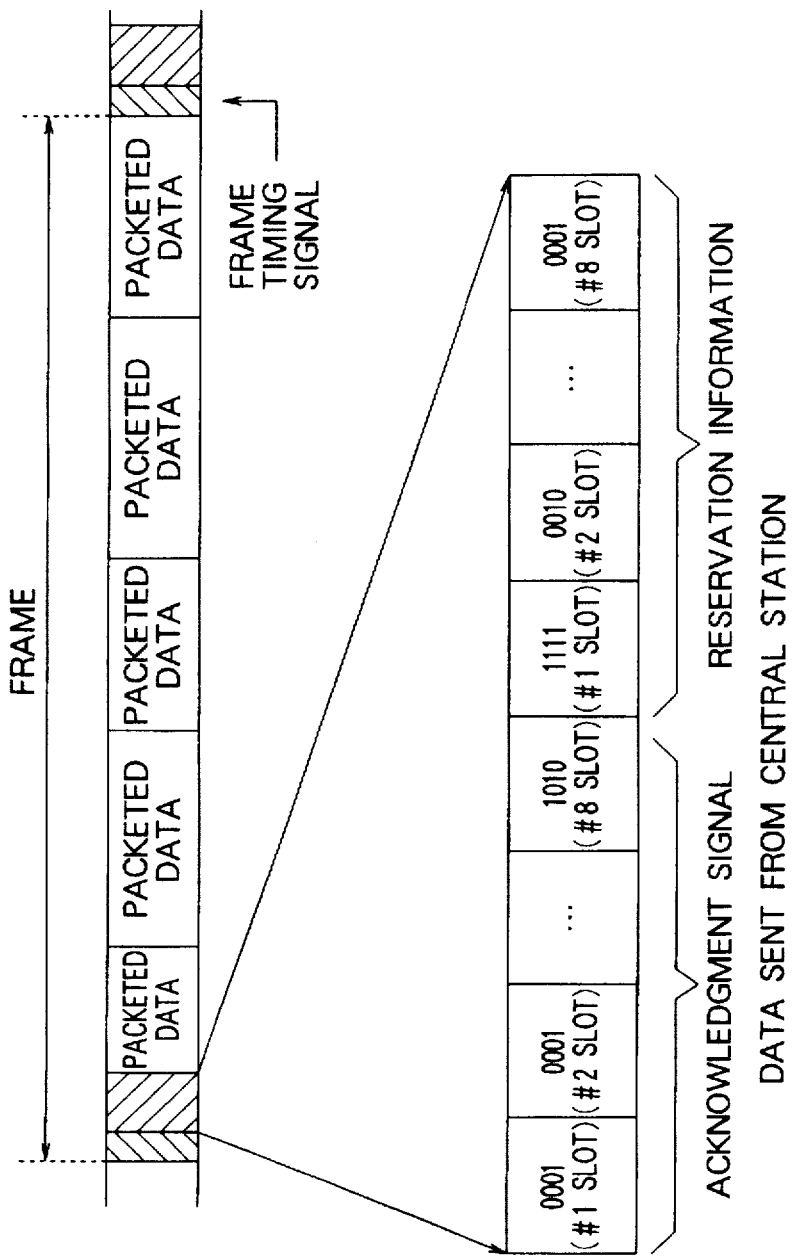
FIGS. 3 and 4 are illustrations of a data format employed by the central station of FIG. 1.

FIG. 3 shows another format of a signal transmitted from the central earth station C to the first through the N-th remote earth stations $T_1$ to $T_N$. The central earth station C transmits packeted data to the first through the N-th remote earth stations $T_1$ to $T_N$ and transmits a frame timing signal indicative of delimitation of the frame having the predetermined time interval at a broadcast mode. The frame timing signal is used as reference of timing used at a time when the first through the N-th remote earth stations $T_1$ to $T_N$ carries out transmission in the respective remote earth stations. The frame timing signal has a transmission interval equal to the length of the frame dividing the common communication channel on transmission of the first and the N-th remote earth stations $T_1$ to $T_N$.

Following to the frame timing signal, the central earth station C transmits an acknowledgment signal for data transmitted by the first through the N-th remote earth stations $T_1$ to $T_N$ at the broadcast mode. The acknowledgment signal is a signal so that the sender addresses of the remote earth stations for data which the central earth station C receives correctly are arranged in time slot order. An address indicative of all "0" is written on the time slot where any data cannot received or data cannot normally received owing to collisions of data, transmission error, and so on.

Following the acknowledgment signal, the central earth station C transmits reservation information at the broadcast mode. The reservation information is information indicating whether each time slot in a frame is a random access time slot or a reservation time slot assigned to any remote earth station. The reservation information is information so that remote addresses assigned with the respective time slots are arranged in time slot order. An address indicative of all "1" is written as a global address for the random access time slot, namely, the time slot which is not assigned to any remote earth station. It is assumed that there is no remote earth station having the remote address of all "0" or all "1".

FIG. 3 illustrates an example of the acknowledgment signal and the reservation information in a case where the frame transmitted from the remote earth stations to the central earth station is divided into eight time slots which are called #1 slot, #2 slot, . . . , and #8 slot. That is, in the example being illustrated, the predetermined integer N is less than fifteen. It is assumed that each of the first through the N-th remote earth stations $T_1$ to $T_N$ has the remote address represented by four bits in binary. Under the circumstances, the illustrated acknowledgment signal indicates that data from the remote earth station having the remote address of "0001" is received at the #1 slot, normal data cannot be received at the #2 slot, and data from the remote earth station having the remote address of "1010" is received at the #8 slot. On the other hand, the illustrated reservation information indicates that the #1 slot is the random access time slot, the #2 slot is the reservation time slot which is reserved for and assigned to the remote earth station having the remote address of "0010", and the #8 slot is the reservation time slot which is reserved for and assigned to the remote earth station having the remote address of "0001".

Figure 4:
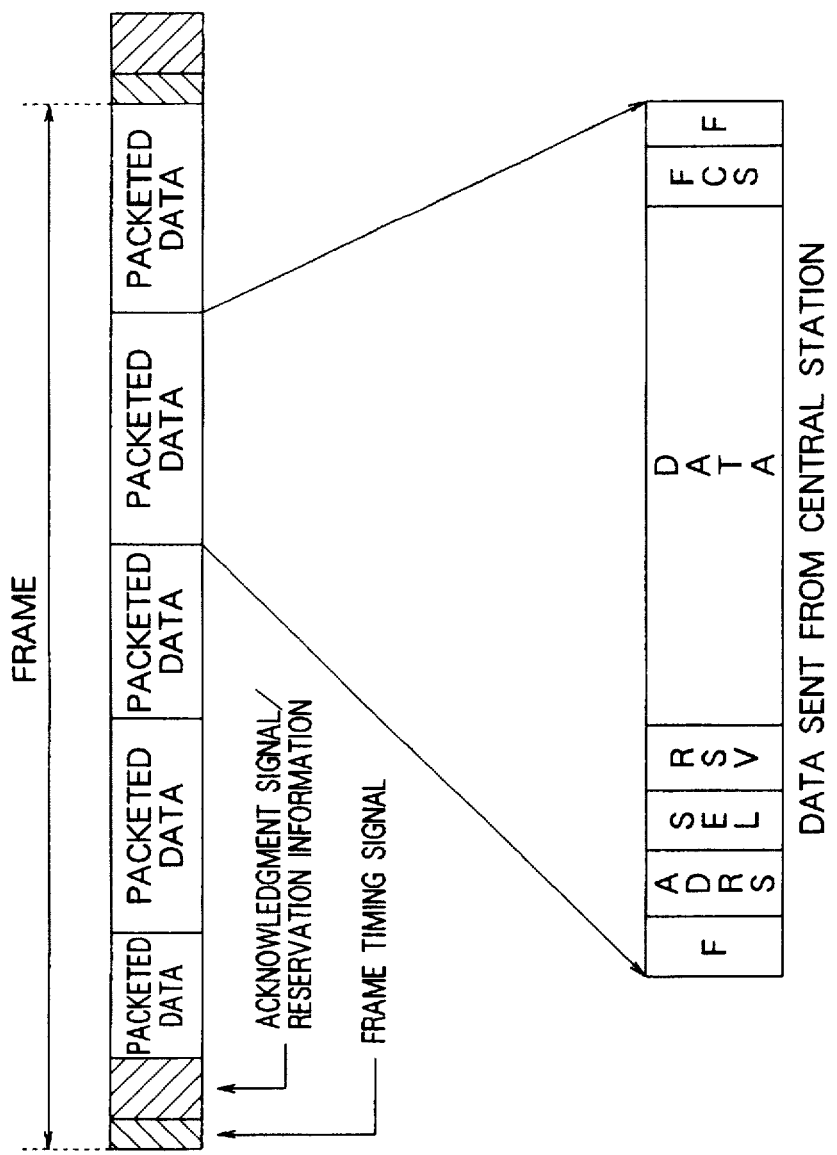

FIG. 4 shows a still another format of packeted data in the signal transmitted from the central earth station C to the first through the N-th remote earth stations $T_1$ to $T_N$. The packeted data transmitted from the central earth station C to the first through the N-th remote earth stations $T_1$ to $T_N$ is data in conformity to high-level data link control (HDLC) and is put between flag patterns (F) representing start and end of the packeted data.

The packeted data transmitted from the central earth station C to the first through the N-th remote earth stations $T_1$ to $T_N$ comprises an address field (ADRS), a first selector field (SEL), a second selector field (RSV), a data field (DATA), and a frame check sequence field (FCS). The address field (ADRS) indicates a destination address for the remote earth station. The first selector field (SEL) indicates whether a message included in the packeted data occurs in the host terminal equipment or is generated for system control and monitor within the central earth station. The second selector field (RSV) indicates whether or not the central earth station carries out reservation for the time slot by predicting reply for the message from the remote earth station. The data field (DATA) includes message data itself. The frame check sequence field (FCS) is for use in detecting transmission error.

Figure 5:
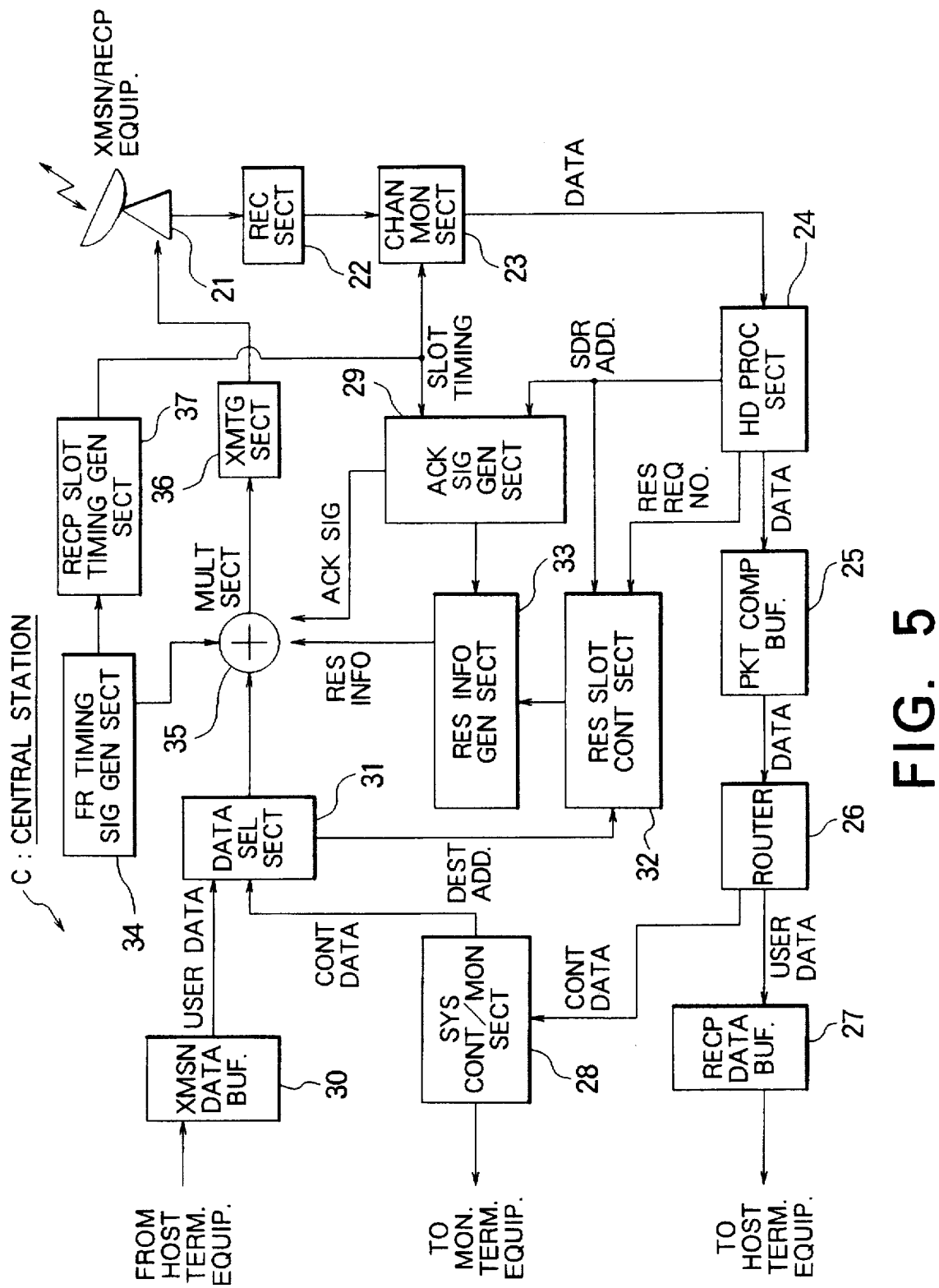
FIG. 5 is a block diagram of the central station illustrated in FIG. 1.

Referring to FIG. 5, the central earth station C comprises a transmission/reception equipment 21, a receiving section 22, a channel monitoring section 23, a header processing section 24, a packet composing buffer 25, a router 26, a reception data buffer 27, a system control/monitor section 28, an acknowledgment signal generating section 29, a transmission data buffer 30, a data selector section 31, a reservation slot control section 32, a reservation information generating section 33, a frame timing signal generating section 34, a multiplexing section 35, a transmitting section 36, and a reception slot timing generating section 37.

The transmission/reception equipment 21 carries out transmission/reception on data to/from the first through the N-th remote earth stations $T_1$ to $T_N$ via the satellite transponder S and carries out frequency conversion between a radio frequency band and an intermediate frequency band.

The receiving section 22 demodulates a signal received by the transmission/reception equipment 21 into demodulated data. Subsequently, the receiving section 23 carries out error correction on the demodulated data to supply a received packet to the channel monitoring section 23.

The channel monitoring section 23 detects transmission error on data between the address field ADRS and the dummy field DMY in the received packet with reference to the frame check sequence field FCS in the received packet. When the transmission error is detected, the channel monitoring section 23 discards the received packet. When the transmission error is not detected, the channel monitoring section 23 delivers data between the address field ADRS and the dummy field DMY in the normally received packet to the header processing section 24.

The header processing section 24 sends the address field ADRS for the sender address in the received packet to the acknowledgment signal generating section 29 and the reservation slot control section 32 and sends the request field REQ indicating a reservation request number of time slots to the reservation slot control section 32. The header processing section 24 delivers the received packet to the packet composing buffer 25.

The packet composing buffer 25 judges whether or not the received packet is one of ones into which the long message is divided by the remote earth station with reference to the information field (PC) in the received packet. When the received packet is not the divided one, the packet composing buffer 25 recognizes the length of the data field DATA on the basis of the length field PL to supply the router 26 with the selector field SEL and the data field DATA in the received packet alone. When the received packet is the divided one, the packet composing buffer 25 buffers the received packets until all of packets are completed. In this event, the packet composing buffer 25 must independently buffer the divided packets for each remote earth station with reference to the sender address in the address field ASRS. When all of packets are completed, the packet composing buffer 25 supplies the router 26 with the selector field SEL and the data field DATA of each packet. In this event, the data field DATA is produced with an original long message composed before it is divided by the remote earth station.

The router 26 supplies, with reference to the selector field SEL produced by the packet composing buffer 25, the data field DATA to either the reception data buffer 27 or the system control/monitor section 28. More specifically, the router 26 supplies the reception data buffer 27 with the user data generated by the user data terminal equipment of the remote earth station. The router 26 supplies the system control/monitor section 28 with data for system control and monitor generated by the remote earth station.

The reception data buffer 27 buffers the data field DATA generated by the router 26, namely, the user data sent from the remote earth station to supply it with the host terminal equipment (not shown).

The system control/monitor section 28 has a function for monitoring and controlling the remote earth stations which serve under the central earth station C. The system control/monitor section 28 delivers information for system control to the remote earth stations and makes an inquiry for status to the remote earth stations. For that purpose, the system control/monitor section 28 collects reply data from the remote earth stations to send necessary information to a monitor terminal equipment (not shown). When the system control/monitor section 28 transmits an information message for system control or a command for status inquiry to the remote earth stations, the system control/monitor section 28 sends it to the data selector section 31.

The acknowledgment signal generating section 29 generates an acknowledgment signal using the sender address received from the header processing section 24. On a timing of an end slot in each frame, the acknowledgment signal generating section 29 supplies the acknowledgment signal to the multiplexing section 35.

The transmission data buffer 30 buffers user data from the host terminal equipment to supply it to the data selector section 31.

The data selector section 31 has first and second functions. The first function is a function for judging whether or not slot reservation is required for data transmitted from the remote earth station that corresponds to data transmitted from the central earth station and that how many reservation time slots are required and for supplying the reservation slot control section 32 with addresses of the remote earth stations requiring the slot reservation and with the number of reservation time slots if necessary. For example, the slot reservation may be carried out for control data outputted from the system control/monitor section 28 because all of the remote earth stations may reply. In user data outputted from the transmission data buffer 10, the slot reservation may be carried out when the user terminal equipment transmits the user data in response to polling from the host terminal equipment in accordance with an application of the host terminal equipment connected to the central earth station. In addition, in this case, the number of the reservation time slots may be a constant value selected between one slot and several slots in the manner which will be later described. Under the circumstances, the above-mentioned first function may be simplified as a function for informing of the address of the remote earth station.

The second function of the data selector section 31 adds the address field ADRS and the first and the second selector fields SEL and RSV to the control data outputted from the system control/monitor section 28 and the user data from the transmission data buffer 30 to generate the packeted data having the format as illustrated in FIG. 4 and to supply it to the multiplexing section 35.

The reservation slot control section 32 lays out a schedule for slot assignment by judging the remote address and the reservation request number for the remote earth stations sent from the header processing section 24 and the remote address and the slot reservation number sent from the data selector section 31 to generate a slot assignment table. Assignment of the reservation slots on generating the slot assignment table is, for example, carried out as follows. For the assignment of reservation time slot for the remote earth stations sent from the data selector section 31, the reservation slot control section 32 assigns one time slot only. For the assignment of reservation time slot for the remote earth stations sent from the header processing section 24, the reservation slot control section 32 assigns the time slots which is equal in number to the reservation request number sent from the header processing section 24.

The reservation information generating section 33 reads, in response to timing for outputting the acknowledgment signal from the acknowledgment signal generating section 29, slot assignment information for one frame out of the slot assignment table which the reservation slot control section 32 controls to supply it as reservation information to the multiplexing section 35.

The frame timing signal generating section 34 supplies this multiplexing section 35 with a frame timing signal indicative of separation of each frame. Simultaneously, the frame timing signal generating section 34 supplies the reception slot timing generating section 37 with a reception frame timing for use in the central earth station C.

The reception slot timing generating section 37 generates, on the basis of the reception frame timing from the frame timing signal generating section 34, a reception slot timing signal for use in the central earth station C to supply it to the channel monitoring section 23 and the acknowledgment signal generating section 29.

The multiplexing section 35 time-division multiplexes the acknowledgment signal from the acknowledgment signal generating section 29, data from the data selector section 31, the reservation information from the reservation information generating section 33, and the frame timing signal from the frame timing signal generating section 34 to supply a time-division multiplexed signal to the transmitting section 36.

The transmitting section 36 adds redundant bits for transmission error detection by a cyclic redundancy check (CRC) system to the time-division multiplexed signal from the multiplexing section 35 to produce an added signal. Subsequently, the transmitting section 36 carries out encoding and modulation on the added signal to supply it to the transmission/reception device 21.

Figure 6:
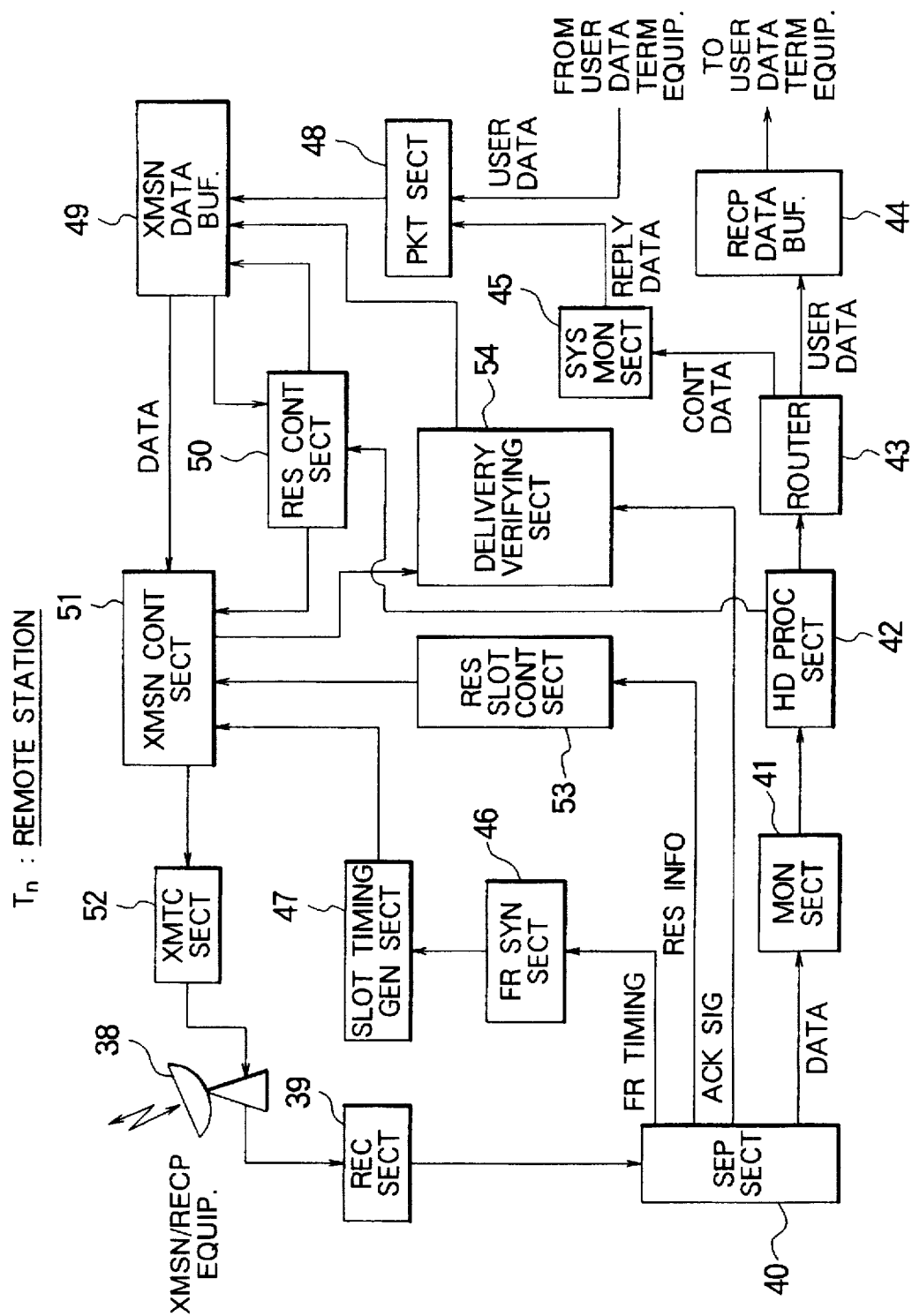
FIG. 6 is a block diagram of each remote station illustrated in FIG. 1.

Referring to FIG. 6, an n-th remote earth station $T_n$, where n represents a variable between 1 and N, both inclusive, comprises a transmission/reception equipment 38, a receiving section 39, a separating section 40, a monitoring section 41, a header processing section 42, a router 43, a reception data buffer 44, a system monitor section 45, a frame synchronizing section 46, a slot timing generating section 47, a packeting section 48, a transmission data buffer 49, a reservation control section 50, a transmission control section 51, a transmitting section 52, a reservation slot control section 53, and a delivery verifying section 54.

The transmission/reception equipment 38 carries out transmission/reception on data to/from the satellite transponder S and carries out frequency conversion between a radio frequency band and an intermediate frequency band.

The receiving section 39 demodulates a signal received by the transmission/reception device 38 into demodulated data. Subsequently, the receiving section 39 carries out error correction on the demodulated data to supply a received packet to the separating section 40.

The separating section 40 detects the frame timing signal in the received packet from the receiving section 39 to separate the received packet into the frame timing signal, the reservation information, the acknowledgment signal, and the packeted data. Subsequently, the separating section 40 supplies the frame timing signal, the reservation information, the acknowledgment signal, and the packeted data to the frame synchronizing section 46, the reservation slot control section 53, the delivery verifying section 54, and the monitoring section 41, respectively.

The monitoring section 41 carries out error detection on the packeted data from the separating section 40. When there is no transmission error in the packeted data and when the packeted data is data for destining for the n-th remote earth station $T_n$, the monitoring section 41 decides that the packeted data is valid received data. Otherwise, the monitoring section 41 discards the packeted data. The monitoring section 41 delivers data between the first selector field SEL and the data field DATA in the valid received data to the header processing section 42.

The header processing section 42 sends the first and the second selector fields SEL and RSV to the reservation control section 50. In addition, the header processing section 42 delivers the received packeted data to the router 43.

The router 43 supplies, with reference to the first selector field SEL in the received packeted data, the data field DATA to either the reception data buffer 44 or the system monitor section 45. More specifically, the router 43 supplies the reception data buffer 44 with the user data. The router 43 supplies the system monitor section 45 with control data for system control and monitor. In this event, the router 43 supplies only the data field DATA to the reception data buffer 44 or the system monitor section 45.

The reception data buffer 44 buffers the data field DATA generated by the router 43, namely, the user data to supply it with the user data terminal equipment (not shown).

The system monitor section 45 receives the control data for system control and a command for status inquiry which are sent from the central earth station C to generate reply data corresponding thereto. The system monitor section 45 supplies the reply data to the packeting section 48.

The frame synchronizing section 46 decides, on the basis of the frame timing signal sent from the central earth station C, a remote frame timing for use in transmission of the n-th remote earth station $T_n$ in consideration of a distance between the satellite transponder S and the n-th remote earth station $T_n$ to supply it to the slot timing generating section 47.

The slot timing generating section 47 divides the frame generated by the frame synchronizing section 46 into time slots of a predetermined number to decide a slot timing.

The packeting section 48 receives, collectively as received data, the user data and the control data from the user data terminal equipment and the system monitor section 45, respectively. When the received data has a data length longer than that of the data field DATA in the time slot, the packeting section 48 divides the received data into a plurality of packets each of which is used as the data field DATA. In addition, the packeting section 48 adds the selector field SEL, the information field PC, the length field PL, the dummy field DMY, and the frame check sequence field FCS to the data field DATA to generate the packeted data having the predetermined format illustrated in FIG. 2 and to supply it to the transmission data buffer 49.

The information field PC includes, for example, a piece of information indicating whether or not the packeted data is a portion of divided packets and another piece of information indicative of sequence number assigned with the portion of divided packets.

The transmission data buffer 49 receives the packeted data from the packeting section 48 and buffers the packeted data as buffered data. The transmission data buffer 49 delivers the buffered data to the transmission control section 51. The transmission data buffer 49 individually buffers the packeted data to be transmitted on the one time slot in the random access mode, the packeted data to be transmitted on the reservation time slots, and the packeted data to be retransmitted owing to transmission failure.

In addition, the transmission data buffer 49 includes a temporary hold buffer (which is later described) for confirmation of delivery. The temporary hold buffer temporarily holds the buffered data outputted to the transmission control section 51. Furthermore, the transmission data buffer 49 includes a retransmission data buffer (which is later described). The transmission data buffer 49 is supplied with an indication signal indicative of either retransmission or release. When the indication signal indicates the release, the transmission data buffer 49 eliminates the data indicated by the release from the temporary hold buffer. When the indication signal indicates the retransmission, the transmission data buffer 49 makes the retransmission data buffer rebuffer the data indicated by retransmission.

The reservation control section 50 controls the number of data buffered in the transmission data buffer 49 as data for the reservation time slots to determine the number of the reservation time slots. In addition, responsive to information from the header processing section 42, the reservation control section 50 controls the number of the reservation time slots preliminarily reserved by the central earth station (which is called an available reservation time slot number ASN) by predicting transmission in the n-th remote earth station $T_n$. Furthermore, the reservation control section 50 controls whether the reservation time slots are reservation time slots for the user data or reservation time slots for system control/monitor data.

When the transmission control section 51 recognizes, as a recognized slot timing, a slot timing in response to the output from the slot timing generating section 47, the transmission control section 51 judges, with reference to the slot assignment table in the reservation slot control section 53, whether the recognized slot timing is the random access slot timing, the reservation slot timing assigned with the n-th remote earth station, or the reservation slot timing assigned with other remote earth stations. When the recognized slot timing is the random access slot timing or the reservation slot timing assigned with the n-th remote earth station $T_n$, the transmission control section 51 selects suitable data from the data buffered in the transmission data buffer 49 to transmit the selected data. In this event, the transmission control section 51 delivers the transmission packeted data to the transmitting section 52 with the address field ADRS and the request field REQ added to the transmission packeted data. In this event, the available reservation time slot number ASN indicated by the reservation control section 50 is set in the request field REQ.

Furthermore, the transmission control section 51 supplies the delivery verifying section 54 with a transmission history signal indicating which of the time slots are used for data transmission.

The transmitting section 52 adds the redundancy field FEC for error correction to data from the transmission control section 51 to produce an added signal. Thereafter, the transmitting section 52 carries out encoding and modulation on the added signal to supply it to the transmission/reception device 38.

The reservation slot control section 53 generates the slot assignment table with reference to the reservation information transmitted from the central earth station C.

The delivery verifying section 54 receives the transmission history signal from the transmission control section 51 to store the transmission history signal indicating which of the time slots are used in the n-th remote earth station $T_n$ for data transmission. The delivery verifying section 54 compares the transmission history signal with the acknowledgment signal sent from the separating section 40 to discriminate whether a response data for the time slot on which the n-th remote earth station $T_n$ tries data transmission indicates acknowledgement ACK or negative acknowledgment NAK. That is, the delivery verifying section 54 judges the acknowledgment ACK when the acknowledgment signal indicates the remote address for the n-th remote earth station $T_n$. The delivery verifying section 54 judges the negative acknowledgment NAK when the acknowledgment signal indicates the address of all "0" or the remote address for any one of the other remote earth stations.

In addition, the delivery verifying section 54 supplies the transmission data buffer 49 with the indication signal indicative of the retransmission relating to the data where the response indicates the negative acknowledgment NAK. On the other hand, the delivery verifying section 54 supplies the transmission data buffer 49 with the indication signal indicative of release from the temporary hold buffer relating to the data where the response indicates the acknowledgement ACK.

Figure 7:
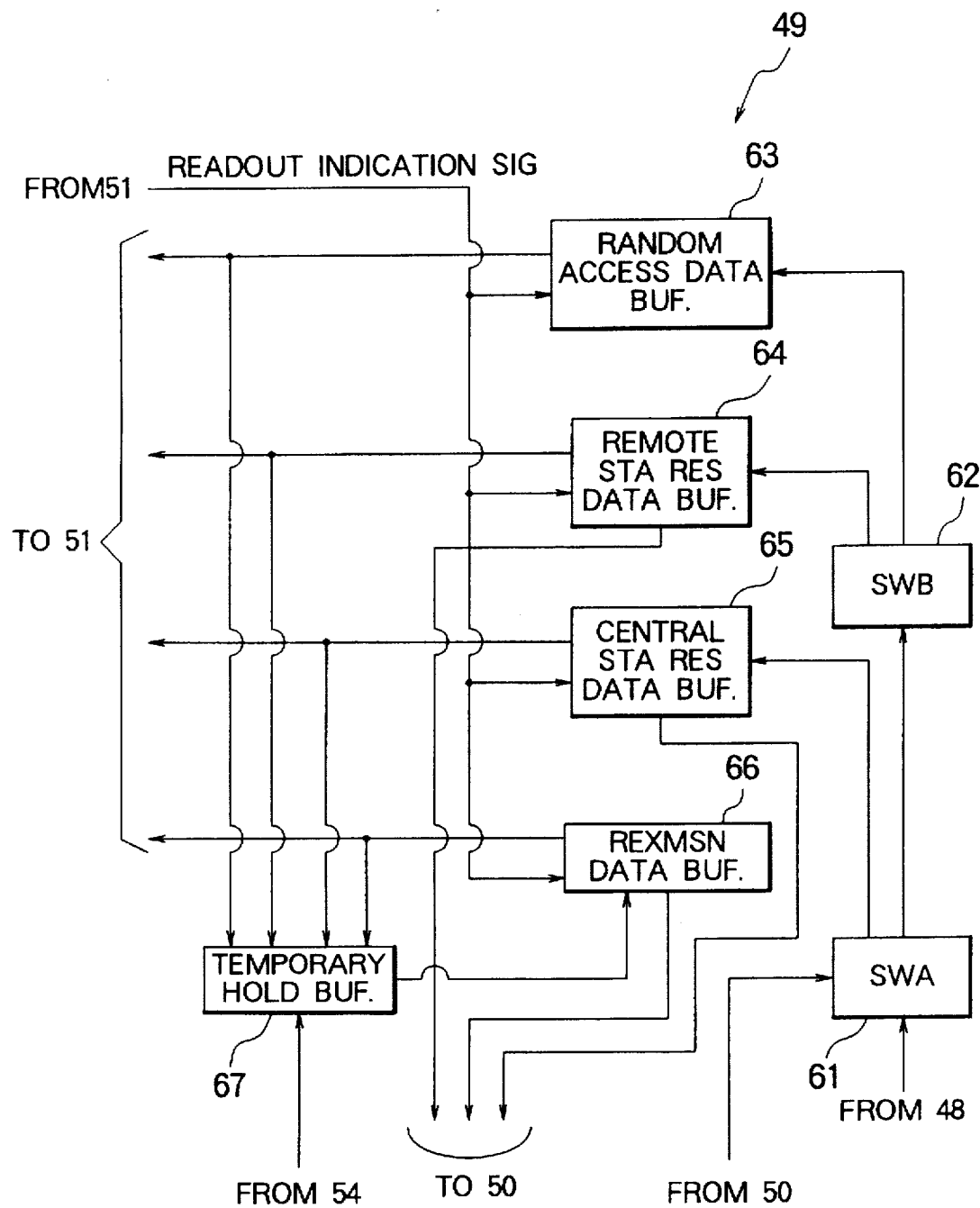
FIG. 7 is a block diagram of a transmission data buffer for use in the remote station illustrated in FIG. 6.

Turning to FIG. 7, the transmission data buffer 49 comprises first and second switching sections (SWA and SWB) 61 and 62, a random access data buffer 63, a remote station reservation data buffer 64, a central station reservation data buffer 65, the retransmission data buffer as depicted at 66, and the temporary hold buffer depicted at 67.

The random access data buffer 63 is for buffering data to be transmitted at the random access. Each of the remote station reservation data buffer 64 and the central station reservation data buffer 65 is for buffering data to be transmitted on the reservation time slot for the n-th remote station $T_n$. The retransmission data buffer 66 is for buffering retransmission data where transmission is failure once. The temporary hold buffer 67 is for temporarily holding the transmitted data for waiting reception confirmation. The remote station reservation data buffer 64 is for buffering data for the reservation time slot which the n-th remote station $T_n$ requests. The central station reservation data buffer 65 is for buffering data for the reservation time slot assigned with the central earth station C.

The transmission data buffer 49 distributes, by using the first and the second switching sections 61 and 62, the packeted data supplied with the packeting section 48 into the random access data buffer 63 and the remote station reservation data buffer 64 and the central station reservation data buffer 65.

The first switching section 61 recognizes the selector field SEL in the packeted data. When the selector field SEL indicates the data for the system control/monitor, the first switching section 61 judges that the central earth station C carries out the slot reservation and therefore makes the central station reservation data buffer 65 buffer the data for the system control/monitor. When the selector field SEL indicates the user data, the first switching section 61 refers to the available reservation slot number ASN for the user data in the central earth station which the reservation control section 50 controls. When the available reservation slot number ASN is not zero, the first switching section 61 makes the central station reservation data buffer 65 buffer the user data. Otherwise, the first switching section 61 supplies the user data to the second switching section 62. The second switching section 62 refers to the information field PC in the packeted data. When the information field PC indicates that the user data is the data having the length within one time slot or the head packet where the long message is divided into two or more packets, the second switching section 62 makes the random access data buffer 63 buffer the user data. Otherwise, the second switching section 62 makes the remote station reservation data buffer 64 buffer the user data which is one of other divided packets in the long message. This is because it is necessary for the other divided packets to request the slot reservation by the remote station $T_n$.

The temporary hold buffer 67 carries out, in accordance with the indication signal from the delivery confirming section 53, cancellation of temporarily held data or transfer to the retransmission data buffer 66.

Each of the retransmission data buffer 66, the remote station reservation data buffer 64, and the central station reservation data buffer 65 delivers the number of the packets buffered therein to the reservation control section 50. But, the central station reservation data buffer 65 refers to the information field PC of the data buffered therein. When two or more divided packets are buffered in the central station reservation data buffer 65, the central station reservation data buffer 65 delivers the number of the packets except for the head packet to the reservation control section 50. This is because regarding the packet having the short length within one time slot and the head packet in the divided packets, the slot reservation is preliminarily carried out by the central earth station C.

Figure 8:
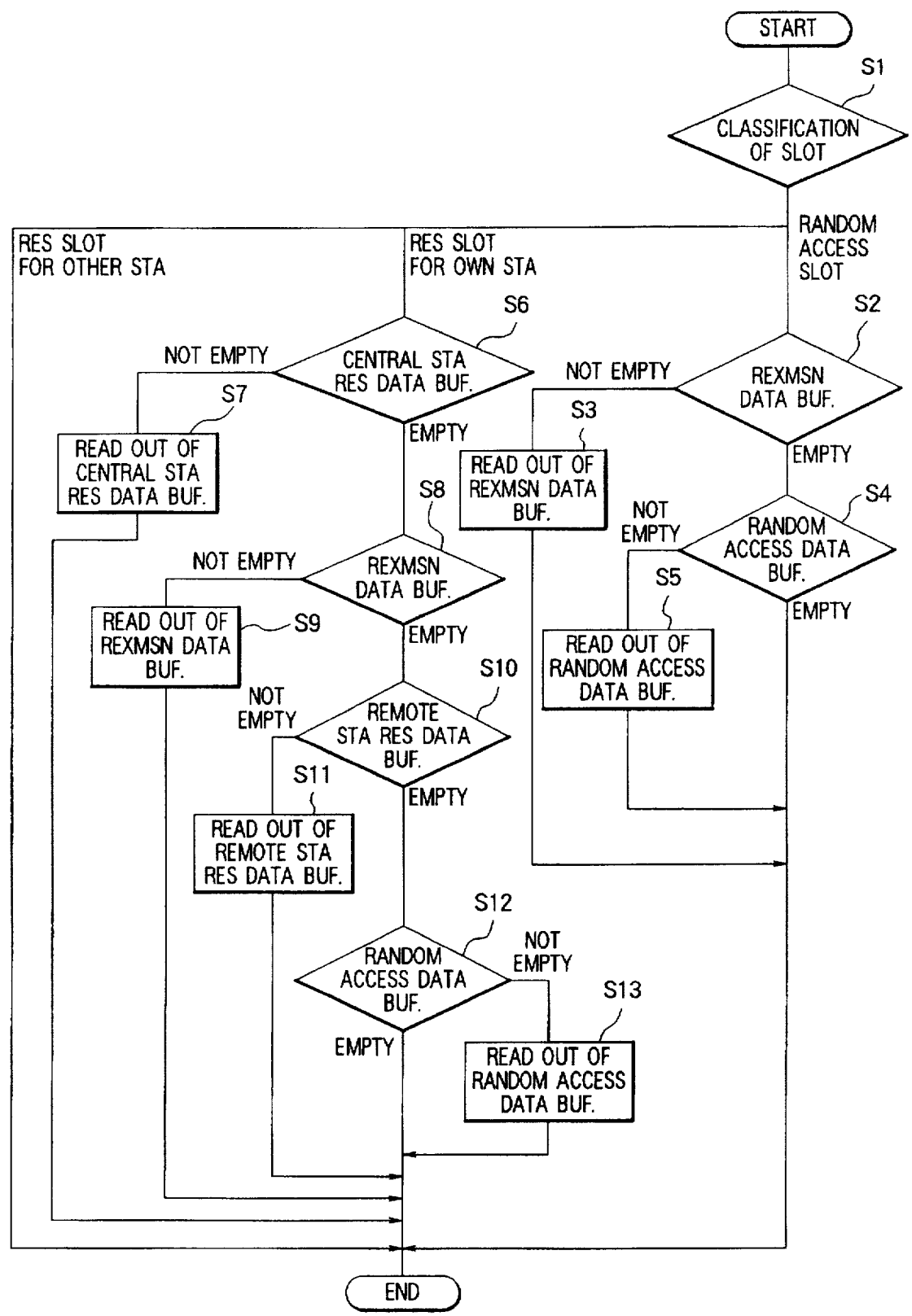
FIG. 8 is a flow chart for describing operation of a transmission control section for use in the remote station illustrated in FIG. 6.

Turning to FIG. 8, description will proceed to an operation of the transmission control section 51 for selecting the buffers in the transmission data buffer 49. The transmission control section 51 at first judges whether each slot timing indicates the random access time slot, the reservation time slot for the n-th remote station $T_n$, or the reservation time slot for the other remote station as a first step S1. When the slot timing indicates the random access time slot, the first step S1 is followed by a second step S2 at which the transmission control section 51 judges whether or not the retransmission data buffer 66 is empty. When the retransmission data buffer 66 is not empty, the second step S2 proceeds to a third step S3 to which the transmission control section 51 reads data out of the retransmission data buffer 66 to transmit it. When the retransmission data buffer 66 is empty, the second step S2 is succeeded by a fourth step S4 at which the transmission control section 51 selects the random access data buffer 63 to judge whether or not the random access data buffer 63 is empty. When the random access data buffer 63 is not empty, the fourth step S4 is followed by a fifth step S5 at which the transmission control section 51 reads data out of the random access data buffer 63 to transmit it. When the random access data buffer 63 is empty, processing comes to end.

When the slot timing indicates the reservation time slot for the n-th remote station $T_n$ at the first step S1, the first step S1 proceeds to a sixth step S6 at which the transmission control section 51 selects the central station reservation data buffer 64 to judge whether or not the central station reservation data buffer 64 is empty. When the central station reservation data buffer 64 is not empty, the sixth step S6 is succeeded by a seventh step S7 at which transmission control section 51 reads data out of the central station data buffer 65 to transmit it. When the central station reservation data buffer 64 is empty, the sixth step S6 is followed by an eighth step S8 at which the transmission control section 51 selects the retransmission data buffer 66 to judge whether or not the retransmission data buffer 66 is empty. When the retransmission data buffer 66 is not empty, the eighth step proceeds to a ninth step S9 at which the transmission control section 51 reads data out of the retransmission data buffer 66 to transmit it.

When the retransmission data buffer 66 is empty, the eighth steps S8 is succeeded by a tenth step S10 at which the transmission control section 51 selects the remote station reservation data buffer 64 to judge whether or not the remote station reservation data buffer 64 is empty. When the remote station reservation data buffer 64 is not empty, the tenth step S10 is followed by an eleventh step S11 at which the transmission control section 51 reads data out of the remote station reservation data buffer 64 to transmit it. When the remote station reservation data buffer 64 is empty, the eleventh step S11 proceeds to a twelfth step S12 at which the transmission control section 51 selects the random access data buffer 63 to judge whether or not the random access data buffer 63 is empty. When the random access data buffer 63 is not empty, the twelfth step S12 is succeeded by a thirteenth step S13 at which the transmission control section 51 reads data out of the random access data buffer 63 to transmit it. When the random access data buffer 63 is empty, processing comes to end.

When the slot timing indicates the reservation time slot for any other remote station at the first step S1, the transmission control section 51 carries out no transmission.

Figure 9:
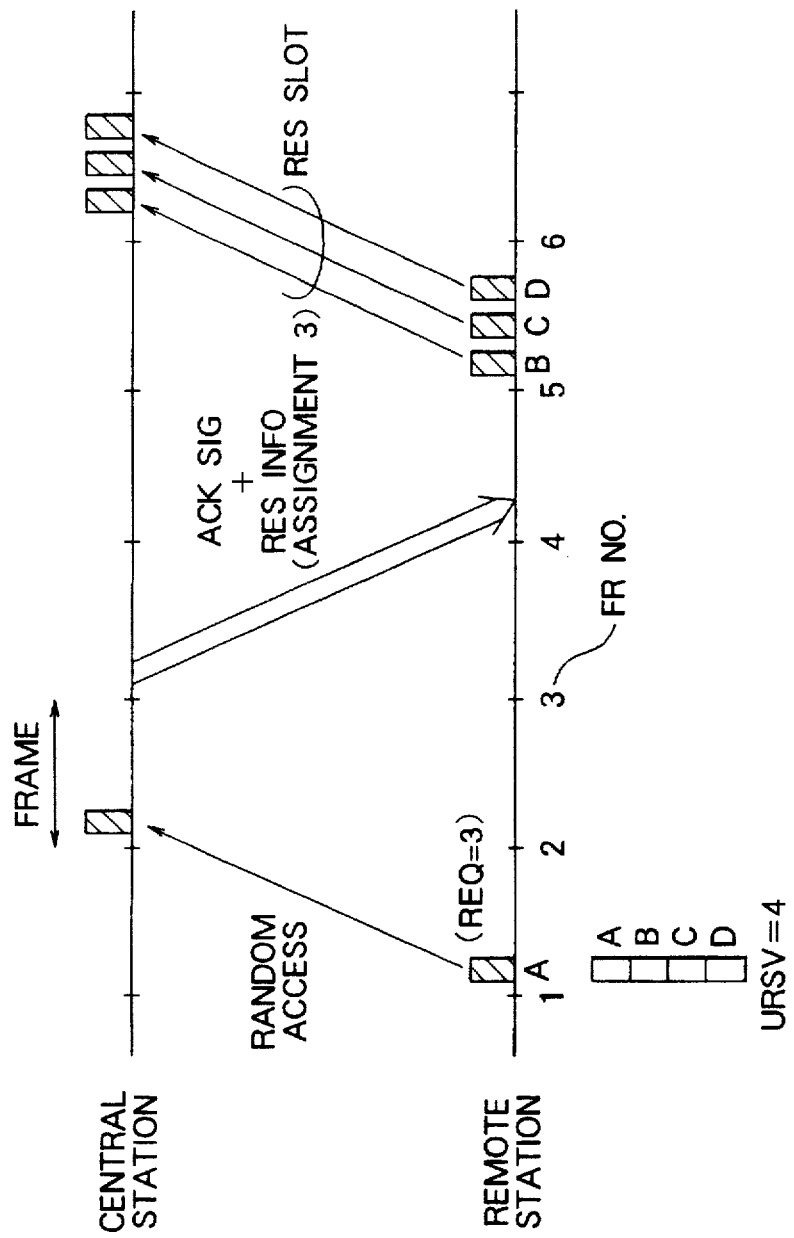
FIG. 9 is a view illustrating an operation of the satellite channel access system according to this invention.

Referring to FIG. 9, description will be directed to operation of the satellite channel access system according to this invention in a case where the n-th remote earth station $T_n$ carries out channel access to request reservation of time slots. It is assumed that the n-th remote earth station $T_n$ generates a long message having a length corresponding to four time slots. In this event, the n-th remote earth station $T_n$ divides the long message into four packets which are named as packets A, B, C, and D. The packet A is called the head packet while three remaining packets B, C, and D are called three succeeding packets. Subsequently, the n-th remote earth station $T_n$ transmits the head packet A on the random access slot with the reservation request (REQ=3) of three time slots for the succeeding three packets B, C, and D added to the head packet A at #1 frame.

The central earth station C receives the head packet A and the reservation request. The central earth station C transmits the acknowledgment signal for the head packet A and the reservation assignment information to the n-th remote earth station $T_n$. The reservation assignment information indicates that time slots for three packets are assigned on #5 frame to the n-th remote earth station $T_n$.

Responsive to the reservation assignment information, the n-th remote earth station $T_n$ transmits the three succeeding packets B, C, and D on the reservation time slots assigned thereby at #5 frame.

It is assumed that the n-th remote earth station $T_n$ stores new data on transmission of the three succeeding packets in the n-th remote earth station $T_n$. In this event, the n-th remote earth station $T_n$ transmits the three succeeding packets with the reservation request information for the new data added thereto in order to receive assignment of new reservation time slots. In this case, it is clear that use of random access time slots is avoided and a probability of collisions between data is therefore reduced.

Figure 10:
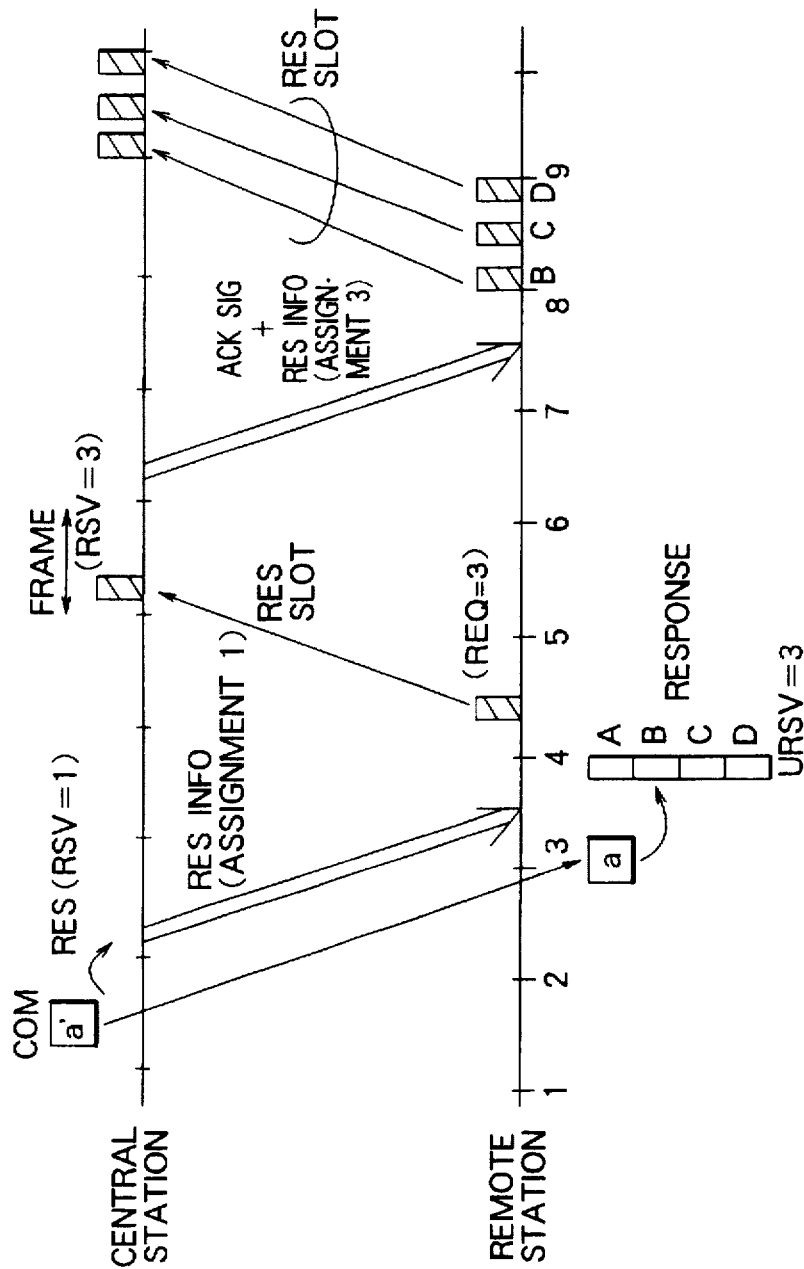
FIG. 10 is a view illustrating another operation of the satellite channel access system according to this invention.

Referring to FIG. 10, description will be directed to another operation of the satellite channel access system according to this invention in another case where the central earth station C transmits polling information of the host terminal equipment to the n-th remote earth station $T_n$.

The central earth station C transmits a packet including a command a to the n-th remote earth station $T_n$. Inasmuch as it is expected that the n-th remote earth station $T_n$ replies to the command a, the central earth station C prepares one time slot for necessary to the n-th remote earth station $T_n$. That is, the central earth station C transmits the packet including the command a with the reservation assignment information added thereto.

It is assumed that the n-th remote earth station $T_n$ generates, in response to the command a, a short message which is possible to reply at the assigned one time slot. In this event, the n-th remote earth station $T_n$ transmits the short message on the reservation assignment time slot and the reply for the command a comes to end.

However, in the case illustrated in FIG. 10, the n-th remote earth station $T_n$ generates a long message having a length corresponding to four time slots. As a result, the n-th remote earth station $T_n$ at first divides the long message into the packets A, B, C, and D. Subsequently, the n-th remote earth station $T_n$ transmits the head packet A on the reservation time slots with the reservation request information (REQ=3) for the three succeeding packets added thereto. After waiting for reservation assignment for the reservation request, the n-th remote earth station $T_n$ transmits the three succeeding packets B, C, and D as illustrated at #7 and #8 frames in FIG. 10.

With this scheme, it is possible for the remote earth stations to avoid transmission on the random access time slots including transmission for the reservation request of the time slots and it results in reducing a probability of data collisions in the random access time slots.

Figure 11:
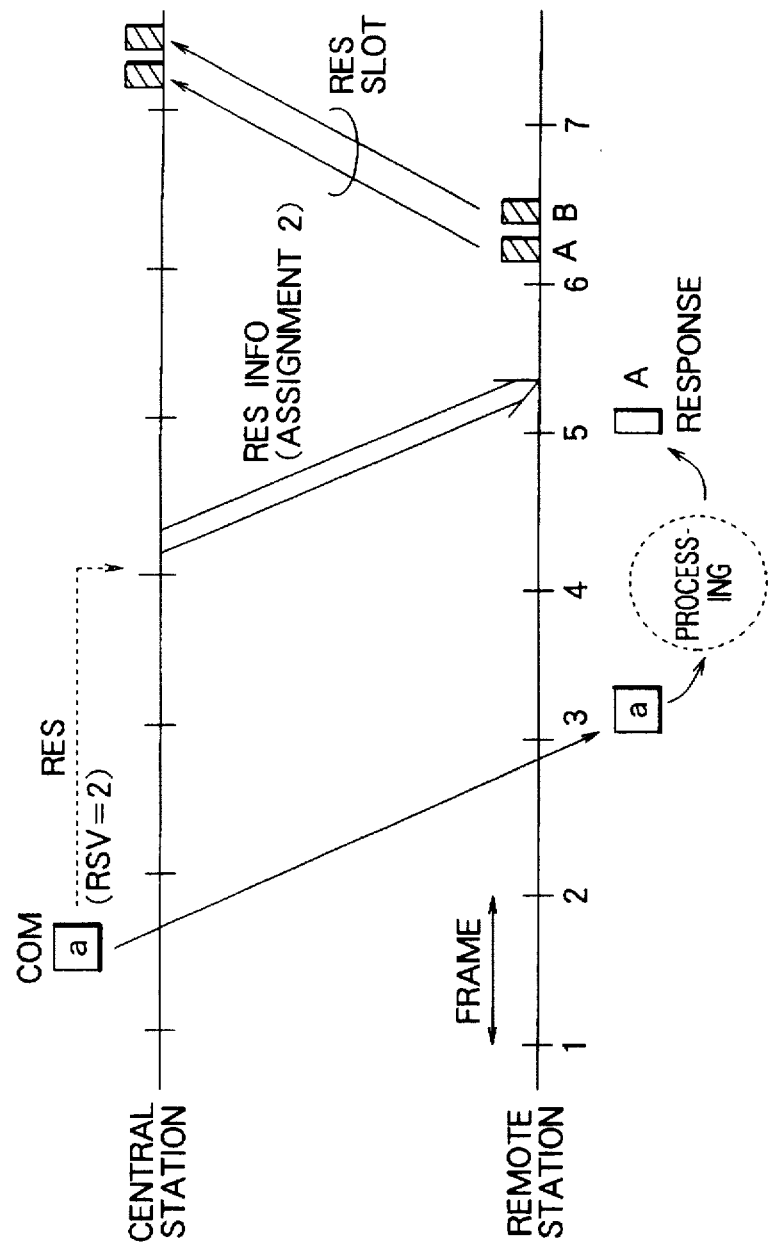
FIG. 11 is a view illustrating still another operation of the satellite channel access system according to this invention.

Referring to FIG. 11, description will be directed to still another operation of the satellite channel access system according to this invention in still another case where the central earth station C transmits the command a to the n-th remote earth station $T_n$ and generation of reply for the command a in the n-th remote earth station $T_n$ is predicted to take a predetermined processing time by the central earth station C.

In this event, when the data selector section 31 in the central earth station C indicates the slot reservation (assignment) to the reservation slot control section 32, the data selector section 31 demands so as to delay generation of the reservation assignment slot in consideration of a timing at which the n-th remote earth station $T_n$ generates data. As a result, the assignment information for specialized time slots is transmitted at a delayed frame.

In the example being illustrated, the central earth station C transmits the reservation information in three frames later from transmission of the packet of the command a. The n-th remote earth station $T_n$ immediately generates reply data A and transmits the generated reply data A on the reservation time slot. In situations where reply data is generated by the n-th remote earth station $T_n$, a second reservation time slot may be assigned to a frame later than that assigned with a first reservation time slot.

When the reservation information is transmitted on or immediately after transmitting the command a, the n-th remote earth station must transmit the reply data using the random access time slot and by carrying out reservation request after the reply data is generated in the n-th remote earth station $T_n$. The case illustrated in FIG. 11 has a shorter transmission delay for data than that of the latter case. In addition, it is understood that the case illustrated in FIG. 11 is an effective method because use of the random access time slot is avoided.

In the above-mentioned satellite channel access systems, description will be made as regards a case where the assignment of the time slots by the central earth station is made so that one time slot or two time slots are assigned on transmission by the central earth station and time slots equal in number to the number of the reservation request are assigned on reservation request by the remote earth station. Such assignment of time slots must synthetically be made out a schedule and set in the central earth station in consideration of the presence or absence of the command for the remote earth stations, contents of the command, the number of reservation request from the remote earth stations, and so on.

For example, in the case illustrated in FIG. 9, only two time slots corresponding to the packets B and C may be assigned to #5 frame of the n-th remote earth station $T_n$ and a remaining time slot corresponding to the packet D may be assigned to a frame after #6 frame by the central earth station. Besides, the assignment may be carried out in response to a new reservation request by the remote earth station.

In the case illustrated in FIG. 10, for instance, the assignment of a lot of time slots may be carried out by prediction of the central earth station on transmission of the command a. In this event, the remote earth stations may suitably transmit stored data other than reply data for the command, individually if there is room for the assigned time slots contrary to the prediction of the central earth station owing to change in occurrence of reply data in the remote earth stations.

As described above, the above-mentioned satellite channel access systems operate such that each remote earth station efficiently takes advantage of one or more time slots assigned by the central earth station in accordance with the conditions of occurrence of data, a probability of data collisions in the random access time slot is possibly reduced, and a delay of data transmission is minimized.

Figure 12:
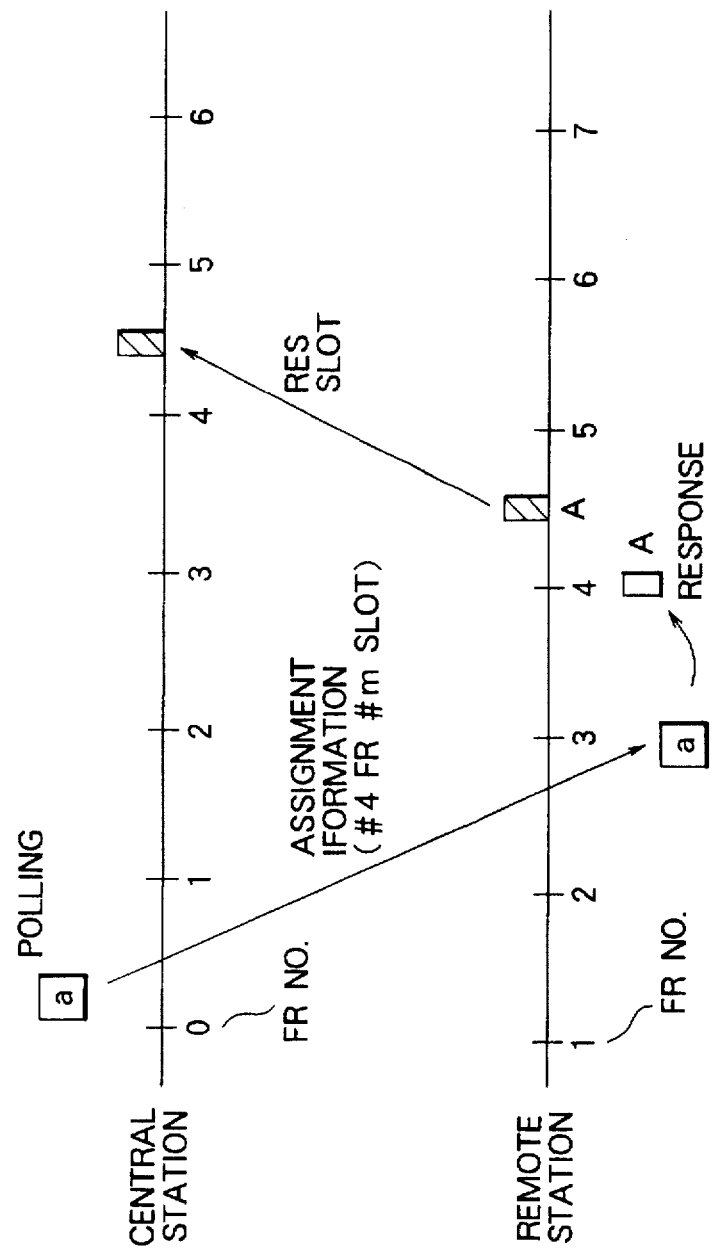
FIG. 12 is a view illustrating an operation of a conventional satellite channel access system.

Referring to FIG. 12, description will be directed to operation of a satellite channel access system in the above-mentioned Kôkai No. Hei 2-308,636. The central earth station transmits a command a for failure detection in the remote earth station to the remote earth station by polling. By transmission of the command a, the central earth station carries out reservation or assignment for a time slot by predicting reply data from the remote earth station. In the example being illustrated, the command a includes assignment information indicative of a reservation slot equal to #m time slot of #4 frame of the remote earth station. Responsive to the command a, the remote earth station transmits the reply data depicted at A on the reservation slot. However, this satellite channel access system cannot be effectively applied to a system which deals with messages having a variable amount of data, as mentioned in the preamble of the instant specification.

While this invention has thus far been described in conjunction with a preferred embodiment thereof, it will now be readily possible for those skilled in the art to put this invention into practice in various other manner. For example, a channel access system to which this invention is applicable is not restricted to the satellite communications system but this invention may be applicable to other communications systems without a satellite transponder.

What is claimed is:

1. A channel access system of a time division multiple access type for carrying out a time division multiple communication between a central station and a plurality of remote stations using a common communication channel, the common communication channel being divided into frames each having a predetermined number of time slots of equal length, the time slots being classified into random access time slots for being randomly accessible by each remote station and reservation time slots for being accessible by reservation, wherein said central station comprises:

first means for carrying out assignment and establishment of the number of reservation time slots for each of said remote stations on the basis of the presence and absence of occurrence of remote transmission data by a destined remote station owing to central transmission data of said central station, prediction of occurrence of the remote transmission data, and reservation requests by said remote stations;

second means for assigning an assigned number of time slots to predetermined positions as reservation time slots exclusively for each of said remote stations; and third means for transmitting reservation assignment information indicative of the reservation time slots;

wherein each of said remote stations comprises:

fourth means for transmitting the remote transmission data in accordance with conditions of occurrence and storing of the remote transmission data thereof with reservation request information indicative of the reservation request suitably added to the remote transmission data on a selected one of the reservation time slots exclusively therefor and the random access time slots.

2. A channel access system as claimed in claim 1, wherein said first means carries out assignment of at least one reservation time slot on transmission of one of system/control data for the remote stations and polling data from a host terminal equipment connected to the central station.

3. A channel access system as claimed in claim 1, wherein said first means predicts a timing of occurrence of the remote transmission data form the destined remote station on the basis of the central transmission data to determine an assignment position of the reservation time slots exclusively for each of the remote stations.

4. A channel access system of a time division multiple access type for carrying out a time division multiple communication between a central station and a plurality of remote stations using a common communication channel, the common communication channel is divided into frames on each having a predetermined number of time slots of equal length, the time slots being classified into random access time slots for being randomly accessible by each remote station and reservation time slots for being accessible by reservation, wherein said central station comprises:
  a data selector section for predicting presence and absence of remote transmission data from a destined remote station owing to central transmission data thereof and amount of occurrence of the remote transmission data to carry out a first reservation request for time slots for said destined remote station;
  a central reservation slot control section, connected to said data selector section, for generating a central slot assignment table including reservation time slots exclusively for each of said remote stations on the basis of the first reservation request from the data selector section and a second reservation request from each of said remote stations; and
  a reservation information generating section, connected to said central reservation slot control section, for generating reservation assignment information indicative of the reservation time slots on the basis of the central slot assignment table of said reservation slot control section to add the reservation assignment information to the central transmission data;

wherein each of said remote stations comprises:
  a reservation control section for setting the number of necessary reservation time slots in accordance with conditions of occurrence and storing of the remote transmission data thereof;
  a remote reservation slot control section for generating a remote slot assignment table on the basis of the reservation assignment information; and
  a transmission control section, connected to said reservation control section and said remote reservation slot control section, for transmitting, on the basis of the number of the reservation time slots set by said reservation control section and the remote slot assignment table, the remote transmission data with reservation request information suitably added to the remote transmission data on a selected one of the reservation time slots exclusive therefor or the random access time slots.

5. A channel access system as claimed in claim 4, wherein said data selector section carries out assignment of at least one reservation time slot on transmission of one of system/control data for the remote stations and polling data from a host terminal equipment connected to the central station.

6. A channel access system as claimed in claim 4, wherein said data selector section predicts a timing of occurrence of the remote transmission data from the destined remote station on the basis of the central transmission data to determine an assignment position of the reservation time slots exclusively for each of the remote stations.

7. A central station for use in a channel access system of a time division multiple access type for carrying out a time division multiple communication between said central station and a plurality of remote stations using a common communication channel, the common communication channel being divided into frames each having a predetermined number of time slots of equal length, the time slots being classified into random access time slots for being randomly accessible by each remote station and reservation time slots for being accessible by reservation, wherein said central station comprises:
  a data selector section for predicting presence and absence of remote transmission data from a destined remote station owing to central transmission data thereof and amount of occurrence of the remote transmission data to carry out a first reservation request for time slots for said destined remote station;
  a reservation slot control section, connected to said data selector section, for generating a slot assignment table including reservation time slots exclusively for each of said remote stations on the basis of the first reservation request from said data selector section and a second reservation request from each of said remote stations; and
  a reservation information generating section, connected to said reservation slot control section, for generating reservation assignment information indicative of the reservation time slots on the basis of the slot assignment table of said reservation slot control section to add the reservation assignment information to the central transmission data.

8. A central station as claimed in claim 7, wherein said data selector section predicts a timing of occurrence of the remote transmission data from the destined remote station on the basis of the central transmission data to carry out a timing request of the reservation time slots to said reservation slot control section.

9. A remote station for use in a channel access system of a time division multiple access for carrying out a time division multiple communication between a central station and a plurality of remote stations using a common communication channel, the common communication channel, being divided into frames each having a predetermined number of time slots of equal length, the time slots being classified into random access time slots for randomly accessible by each remote station and reservation time slots for being accessible by reservation, wherein said remote station comprises:
  a transmission data buffer comprising a random access data buffer, a remote station reservation data buffer, a central station reservation data buffer, a retransmission data buffer, and switching means, the random access data buffer being for buffering data to be transmitted at random access, the remote station reservation data buffer being for buffering data for the reservation time slot which said remote station request, the central station reservation data buffer being for buffering data for the reservation time slot assigned by said central station on the basis of the prediction of occurrence of the remote transmission data by said remote station owing to central transmission data of said central station, said retransmission data buffer being for buffering retransmission data where a transmission failure occurs once, said transmission data buffer distributing, by using the switching means, packeted data into the random access data buffer, the remote station reservation data buffer, and the central station reservation data buffer;

a reservation control section for setting the number of necessary reservation time slots in accordance with conditions of occurrence and storing of the remote transmission data thereof, said reservation control section controlling the switching means of said transmission data buffer;

a reservation slot control section for generating a slot assignment table on the basis of the reservation assignment information; and a transmission control section, connected to said transmission data buffer, said reservation control section, and said reservation slot control sections for transmitting, on the basis of the number of the reservation time slots set by said reservation control section and the slot assignment table, the remote transmission data with reservation request information suitably added to the remote transmission data on a selected one of the reservation time slots exclusive therefor or the random access time slots, said transmission control section judging timings and kinds of the time slots in accordance with the slot assignment table to select and transmit data in one of the random access data buffer, the remote station reservation data buffer, the central station reservation data buffer, and the retransmission data buffer.

* * * * *